(12) United States Patent
Yoshikawa (10) Patent No.: US 7,999,655 B2
(45) Date of Patent: Aug. 16, 2011

(54) COMMUNICATION SYSTEM (75) Inventor: Fumitaka Yoshikawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 855 days.

(21) Appl. No.: 10/716,308

(22) Filed: Nov. 18, 2003

(65) Prior Publication Data

US 2004/0150512 A1 Aug. 5, 2004

(30) Foreign Application Priority Data

Nov. 18, 2002 (JP) .................................. 2002-333754

(51) Int. Cl.
*H04Q 1/00* (2006.01)

(52) U.S. Cl. .................................. 340/5.72; 340/426.13

(58) Field of Classification Search .................. 340/5.72, 340/5.7, 5.61–5.64, 5.31, 426.36, 426.13–426.17, 340/5.1, 5.2; 455/343.1, 343.2, 343.3, 572, 455/574, 41.2

See application file for complete search history.

(56) References Cited

U.S. PATENT DOCUMENTS

| 5,475,374 | A | * | 12/1995 | Moore | 340/825.22 |
| 5,796,827 | A | * | 8/1998 | Coppersmith et al. | 713/182 |
| 6,396,412 | B1 | * | 5/2002 | Banas | 340/5.2 |
| 6,670,883 | B1 | | 12/2003 | Asakura et al. | |
| 6,765,471 | B1 | * | 7/2004 | Baudard et al. | 340/5.61 |
| 6,856,804 | B1 | * | 2/2005 | Ciotta | 455/435.1 |
| 2002/0025823 | A1 | * | 2/2002 | Hara | 455/456 |
| 2003/0076842 | A1 | * | 4/2003 | Johansson et al. | 370/401 |

FOREIGN PATENT DOCUMENTS

| JP | 2001-098810 | 4/2001 |
| JP | 2001-254549 | 9/2001 |
| JP | 2002-247656 | 8/2002 |

* cited by examiner

*Primary Examiner* — Brian A Zimmerman
*Assistant Examiner* — Yong Hang Jiang
(74) *Attorney, Agent, or Firm* — Saul Ewing LLP (57) ABSTRACT

A communication system that controls the disabling and enabling of a communication function in a communication portion of a portable device in accordance with whether the communication function of the portable device is disabled or enabled. The communication system includes a selection device for selecting a disablement mode, which disables automatic communication of the portable device with respect to a communication controller, and a communication mode, which enables automatic communication of the portable device. A determination unit recognizes which one of the disablement mode and the communication mode the portable device is in to determine whether to enable or disable automatic communication with respect to the portable device in accordance with the recognition. A recognition information providing device provides the determination unit with recognition information used to recognize which one of the disablement mode and the communication mode the portable device is in.

12 Claims, 7 Drawing Sheets

COMMUNICATION SYSTEM

BACKGROUND OF THE INVENTION

The present invention relates to a communication system using a portable device provided with a communication function.

Japanese Laid-Open Patent Publication No. 2002-247656 describes an example of a portable device known in the prior art that is provided with a smart entry function. The smart entry function is one type of vehicle control performed by means of wireless communication. When a user holding a portable device, which has a preset ID code, approaches a vehicle, a controller installed in the vehicle verifies the ID code. When the controller determines that the ID code is authentic, the vehicle door is automatically unlocked. When the user, who is holding the portable device, moves away from the vehicle, the vehicle door is automatically locked.

The portable device of the prior art has a manual switch to disable the smart entry function. The manual switch is used to disable the smart entry function and reduce the power consumed by the portable device.

However, when the controller of the vehicle does not recognize that the portable device has disabled the smart entry function, the controller remains activated to support the smart entry function and thus consumes power.

SUMMARY OF THE INVENTION

One aspect of the present invention is a communication system including a portable device provided with a communication function. A communication controller automatically performs mutual communication with the portable device and controls a predetermined driver in accordance with whether mutual communication with the portable device is established. A selection device selects one of a disablement mode, which disables automatic communication of the portable device with respect to the communication controller, and a communication mode, which enables automatic communication of the portable device. A determination unit recognizes which one of the disablement mode and the communication mode the portable device is in to determine whether to enable or disable automatic communication with respect to the portable device in accordance with the recognition. A recognition information providing device provides the determination unit with recognition information used to recognize which one of the disablement mode and the communication mode the portable device is in.

A further aspect of the present invention is a method for reducing power consumption in a communication system. The communication system includes a portable device and a communication controller that performs automatic communication with the portable device. The method includes selecting with the portable device one of a disablement mode for disabling automatic communication of the portable device relative to the communication controller and a communication mode for enabling automatic communication of the portable device, transmitting recognition information used to recognize which one of the disablement mode and the communication mode the portable device is in, determining with the communication controller which one of the disablement mode and the communication mode the portable device is in from the recognition information, and disabling automatic communication of the communication controller relative to the portable device when it is determined that the portable device is in the disablement mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 2:
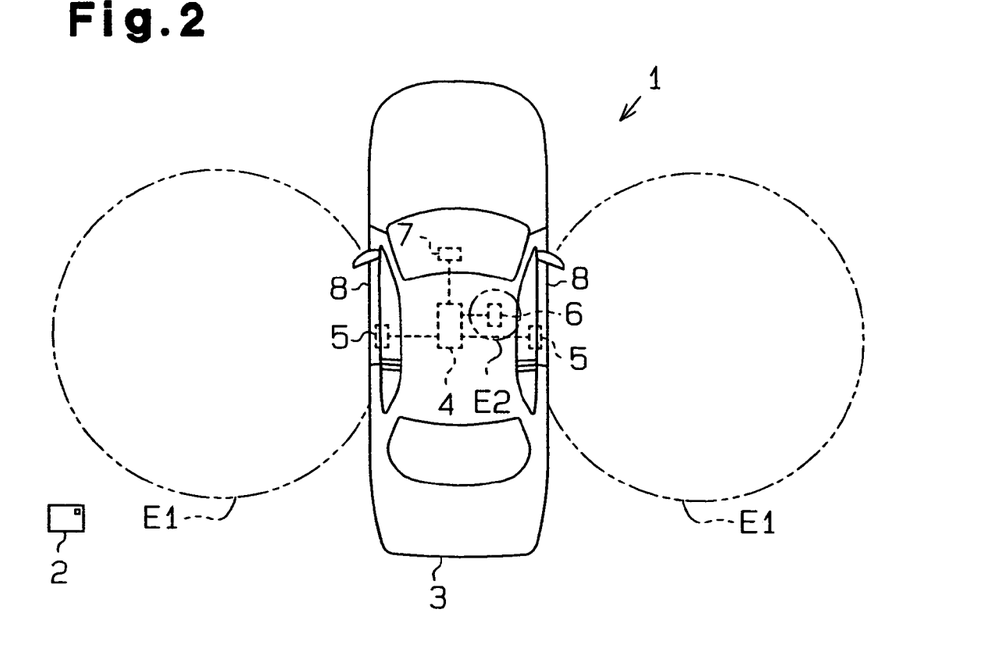
FIG. 2 is a schematic diagram showing the entire structure of the communication system of FIG. 1.

FIG. 2 is a schematic diagram showing a communication system 1 according to a first embodiment of the present invention. The communication system 1 includes a card type portable device 2 (refer to FIG. 3), which is used to perform predetermined key operations by means of wireless communication, and a communication controller 4, which is installed in a vehicle 3. The portable device 2 and the communication controller 4 automatically perform communication with each other. Various signals (radio waves) are exchanged between the communication controller 4 and the portable device 2 by antennas 5, 6, and 7, which are arranged in the vehicle 3.

The antennas 5 are arranged in the left and right doors 8 of the vehicle 3. The antenna 6 is arranged near the driver's seat. The antenna 7 is used to receive signals. The antennas 5 enable wireless communication between the communication controller 4 and the portable device 2 when the portable device 2 is in ranges E1. The antenna 6 enables wireless communication between the communication controller 4 and the portable device 2 when the portable device 2 is in range E2. Signal lines (communication cables) connect the antennas 5-7 and the communication controller 4.

Figure 1:
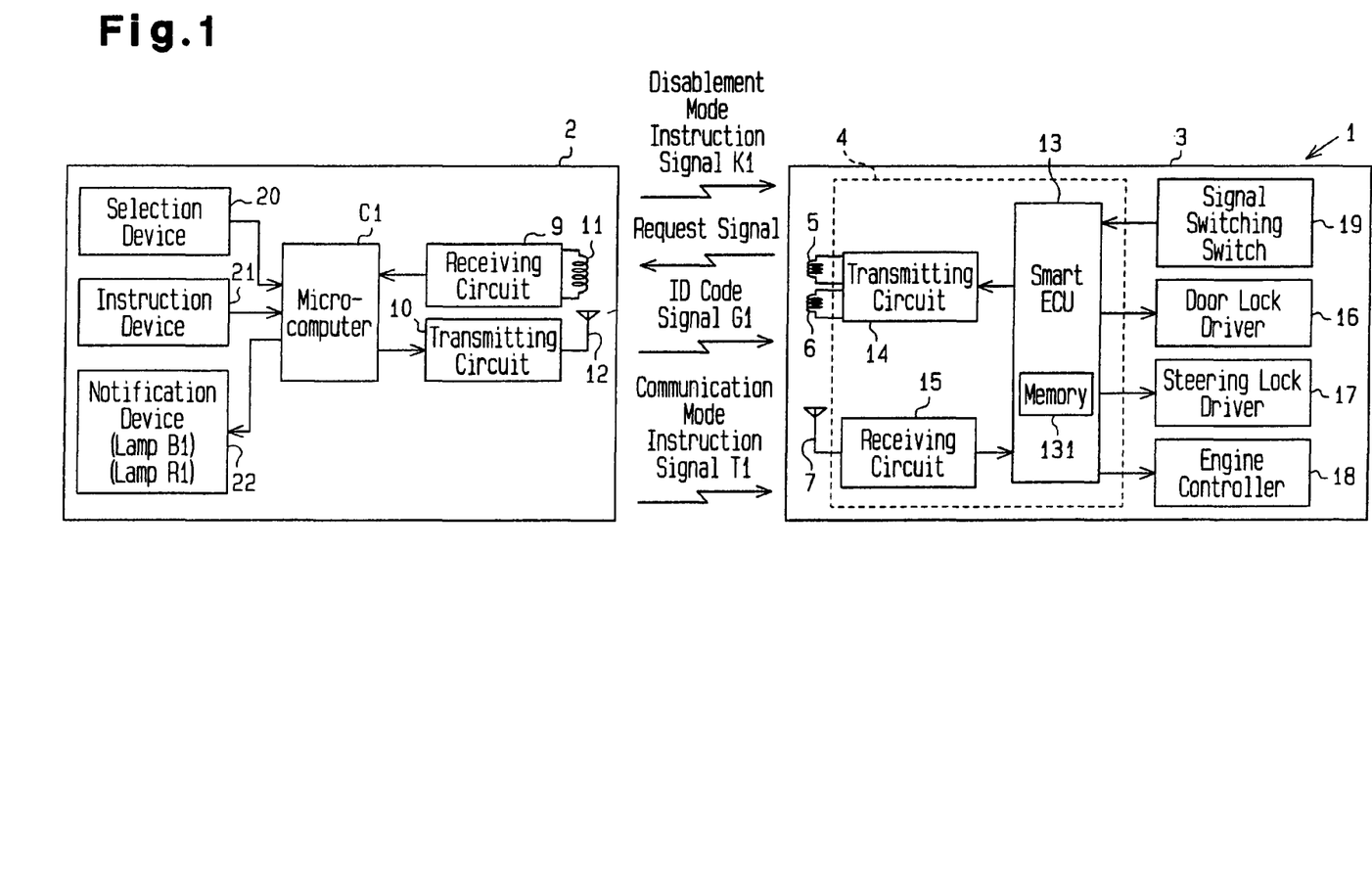
FIG. 1 is a schematic electric diagram of a communication system according to a first embodiment of the present invention.

FIG. 1 is a schematic electric diagram of the communication system 1. The communication system 1 includes a smart key system. The smart key system is provided with a keyless entry function that automatically locks the doors 8 of the vehicle 3 when a person holding the portable device 2 approaches the doors 8 and locks the doors 8 when the person holding the portable device 2 moves away from the doors 8.

The smart key system is also provided with an ignition function for starting the engine by turning an ignition knob (not shown).

The smart key system will now be discussed.

As shown in FIG. 1, the communication controller 4 includes a smart ECU 13, a transmitting circuit 14, and a receiving circuit 15. The transmitting circuit 14 converts a request signal received from the smart ECU 13 to a radio wave having a predetermined frequency and transmits the converted request signal to an external device via the antennas 5 or 6. The receiving circuit 15 receives an ID code signal from an external device via the antenna 7, converts the ID code signal to a pulse signal, and provides the pulse signal to the smart ECU 13.

The smart ECU 13 includes a CPU (not shown) and a memory 131. The memory 131 stores the ID code of the portable device 2. When the smart ECU 13 is provided with the ID code signal, the smart ECU 13 verifies the received ID code with the stored ID code. When the two ID codes match, the smart ECU 13 activates a door lock driver 16, a steering lock driver 17, and an engine controller 18. The communication controller 4 controls the door lock driver 16 based on the establishment of mutual communication with the portable device 2.

The smart ECU 13 has a communication mode, in which it outputs a request signal, and a sleep mode, in which it does not output a request signal. In the communication mode, the smart ECU 13 enables the communication controller 4 to perform automatic communication (transmission) with respect to the portable device 2. In other words, the smart ECU 13 enables the transmitting circuit 14 to enter a state in which communication is enabled. In this state, the transmitting circuit 14 consumes standby power.

In the sleep mode, the smart ECU 13 disables the communication controller 4 from performing automatic communication (signal transmitting) with respect to the smart ECU 13. In other words, the smart ECU 13 inactivates the transmitting circuit 14. In this state, the transmitting circuit 14 does not consume standby power.

The vehicle 3 includes a signal switching switch 19, which is connected to the smart ECU 13. The signal switching switch 19 provides the smart ECU 13 with an OFF signal before the driver enters the vehicle 3 and an ON signal after the driver opens the door 8, enters the vehicle 2, and closes the door 8. When the smart ECU 13 is in the communication mode, the smart ECU 13 issues the request signal via the antennas 5 in response to the OFF signal from the signal switching switch 19. Further, the smart ECU 13 issues the request signal via the antenna 6 in response to the ON signal from the signal switching switch 19.

The portable device 2 includes a microcomputer C1, a receiving circuit 9, and a transmitting circuit 10. The microcomputer C1 has a communication mode, in which it responds to a request signal, and a disablement mode, in which it does not respond to the request signal. In the communication mode, the microcomputer C1 enables the communication controller 4 to perform automatic communication (signal receiving) with respect to the communication controller 4. In other words, the microcomputer C1 enables the receiving circuit 9 to enter a state in which it receives signals. In this state, the receiving circuit 9 consumes standby power. The receiving circuit 9 receives the request signal from the communication controller 4 via an antenna 11 and provides the microcomputer C1 with the request signal.

In the disablement mode, the microcomputer C1 disables the communication controller 4 from performing automatic communication (signal receiving) for the portable device 2 with respect to the communication controller 4. That is, the microcomputer C1 disables the receiving circuit 9 from receiving signals. In this state, the receiving circuit 9 does not consume power.

When the microcomputer C1 is in the communication mode, in response to the request signal, the microcomputer C1 generates an ID code signal that corresponds to the ID code of the portable device 2. The transmitting circuit 10 modulates the ID code signal to a predetermined frequency and generates a modulated ID code signal G1. Then, the transmitting circuit 10 transmits the modulated ID code signal G1 to an external device via an antenna 12.

Figure 3:
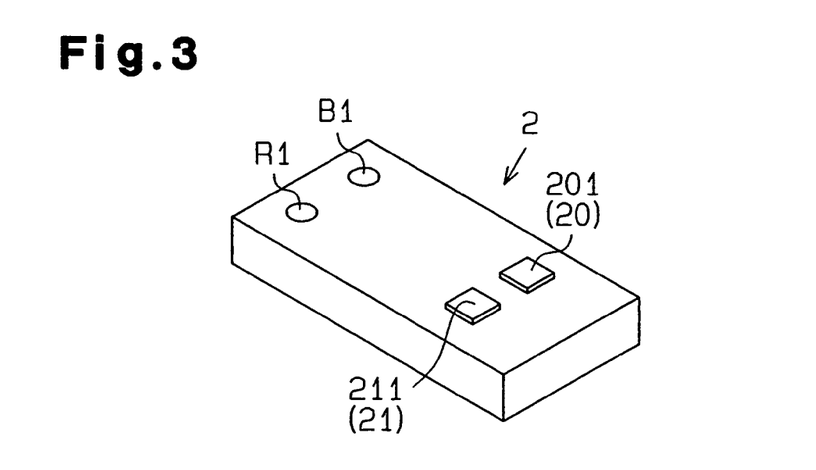
FIG. 3 is a perspective view showing a portable device in the communication system of FIG. 1.

The portable device 2 includes a selection device 20, an instruction device 21, and a notification device 22. With reference to FIG. 3, the selection device 20 includes a selection switch 201, which is arranged on a surface of the portable device 2. When the selection switch 201 is activated once, the selection device 20 sends disablement mode information to the microcomputer C1.

With reference to FIG. 3, the instruction device 21 includes an instruction switch 211, which is arranged on the surface of the portable device 2. When the instruction switch 211 is activated, the instruction device 21 sends door unlock enablement information to the microcomputer C1. In response to the door lock enablement information, the microcomputer C1 issues an ID code signal G1 via the antenna 12.

As shown in FIG. 3, the notification device 22 includes lamps B1 and R1, which are arranged on the surface of the portable device 2. The lamp B1 is a blue LED, and the lamp R1 is a red LED.

When the microcomputer C1 is in the communication mode, the smart key system operates as described below.

If the doors 8 are locked, the signal switching switch 19 provides the smart ECU 13 with the OFF signal. The smart ECU 13 intermittently transmits the request signal via the antenna 5. When a person holding the portable device 2 enters any one of the ranges E1 (refer to FIG. 2), the portable device 2 receives the request signal via the antenna 11. In response to the received request signal, the microcomputer C1 transmits the ID code signal G1 from the antenna 12. In other words, the portable device 2 waits in the standby mode and automatically returns the ID code signal G1 only when receiving the request signal.

Subsequently, the smart ECU 13 receives the ID code signal G1 via the antenna 7 and the receiving circuit 15 and verifies the received ID code with the ID code stored in the memory 131. If the received ID code matches the stored ID code when the smart ECU 13 is receiving the OFF signal from the signal switching switch 19, the smart ECU 13 activates the door lock driver 16 to unlock the doors 8. If the two ID codes do not match, the smart ECU 13 keeps the doors 8 locked. Accordingly, the smart entry function automatically unlocks the doors 8.

Then, after the driver sits in the driver's seat and closes the door 8, the signal switching switch 19 provides the smart ECU 13 with the ON signal. In accordance with the ON signal, the smart ECU 13 intermittently transmits the request signal from the antenna 6. The portable device 2 receives the request signal via the antenna 11 in the range E2 (refer to FIG. 2). When receiving the request signal, the microcomputer C1 transmits the ID code signal G1 via the antenna 12. The smart ECU 13 receives the ID code signal G1 via the antenna 7 and the receiving circuit 15 and verifies the ID code of the ID code signal G1 with the stored ID code.

If the two ID codes match when the smart ECU 13 is receiving the ON signal from the signal switching switch 19, the smart ECU 13 enables the engine to be started. In other words, the smart ECU 13 drives the steering lock driver 17 to unlock the steering wheel (not shown) and provides the engine controller 18 with an engine start enablement signal. When the ignition knob is turned, the engine controller 18 performs fuel injection and engine ignition in accordance with the engine start enablement signal to start the engine.

Even when the smart ECU is receiving the ON signal, the smart ECU 13 does not enable engine starting unless the two ID codes match. That is, the smart ECU 13 does not provide the engine controller 18 with the engine start enablement signal. Thus, the engine controller 18 does not perform fuel injection (or engine ignition) to start the engine even if the ignition knob is turned. Accordingly, in the first embodiment, the ignition function is not activated unless the ID code of the portable device 2 matches the ID code of the smart ECU 13. As a result, a third person that does not have the portable device 2 would not be able to start the engine.

The communication control performed when switching the microcomputer C1 between a communication mode and a disablement mode will now be discussed in accordance with the communication control program shown in the flowcharts of FIGS. 4 and 5.

When the microcomputer C1 and the smart ECU 13 are in the communication mode, the lamp B1 of the portable device 2 is lit, and the microcomputer C1 enables automatic communication (signal receiving) for the portable device 2 relative to the communication controller 4. That is, the receiving circuit 9 is in a state in which the receiving of signals is enabled. The microcomputer C1 waits for the input of disablement mode information from the selection device 20 (step S1). Further, the smart ECU 13 waits for the input of a disablement mode instruction signal K1 (step S12).

When the portable device 2 is outside the ranges E1, the portable device 2 does not receive the request signal from the communication controller 4. In this state, mutual communication between the portable device 2 and the communication controller 4 is not established. When the portable device 2 enters the ranges E1, the portable device 2 receives a request signal from the communication controller 4. In this state, mutual communication is established between the portable device 2 and the communication controller 4. When the selection switch 201 is activated once, the selection device 20 sends disablement mode information to the microcomputer C1 (YES in step S1). In this state, when the portable device 2 is outside the ranges E1 and thus does not receive the request signal (NO in step S2), the microcomputer C1 returns to step S1.

When the portable device 2 is in one of the ranges E1 and receives the request signal (YES in step S2), the microcomputer C1 outputs the disablement mode instruction signal K1, which is recognition information, via the antenna 12 (step S3). The microcomputer C1 instructs the notification device 22 to turn off the lamp B1 and flash the lamp R1 a predetermined number of times (step S4). In accordance with the instruction, the notification device 22 turns off the lamp B1 and flashes the lamp R1 a predetermined number of times. Further, the microcomputer C1 shifts from the communication mode to the disablement mode (step S5). In the disablement mode, the microcomputer C1 disables automatic communication (signal receiving) for the portable device 2 with respect to the communication controller 4. In other words, the microcomputer C1 causes the receiving circuit 9 to enter a state in which the receiving of signals is disabled (step S6).

If the instruction switch 211 is activated when the microcomputer C1 is in the disablement mode, the microcomputer C1 generates the ID code signal G1. When the portable device 2 is in one of the ranges E1, the smart ECU 13 receives the ID code signal G1 from the portable device 2 to perform code verification and activate the door lock driver 16 to unlock the doors 8.

Figure 5:
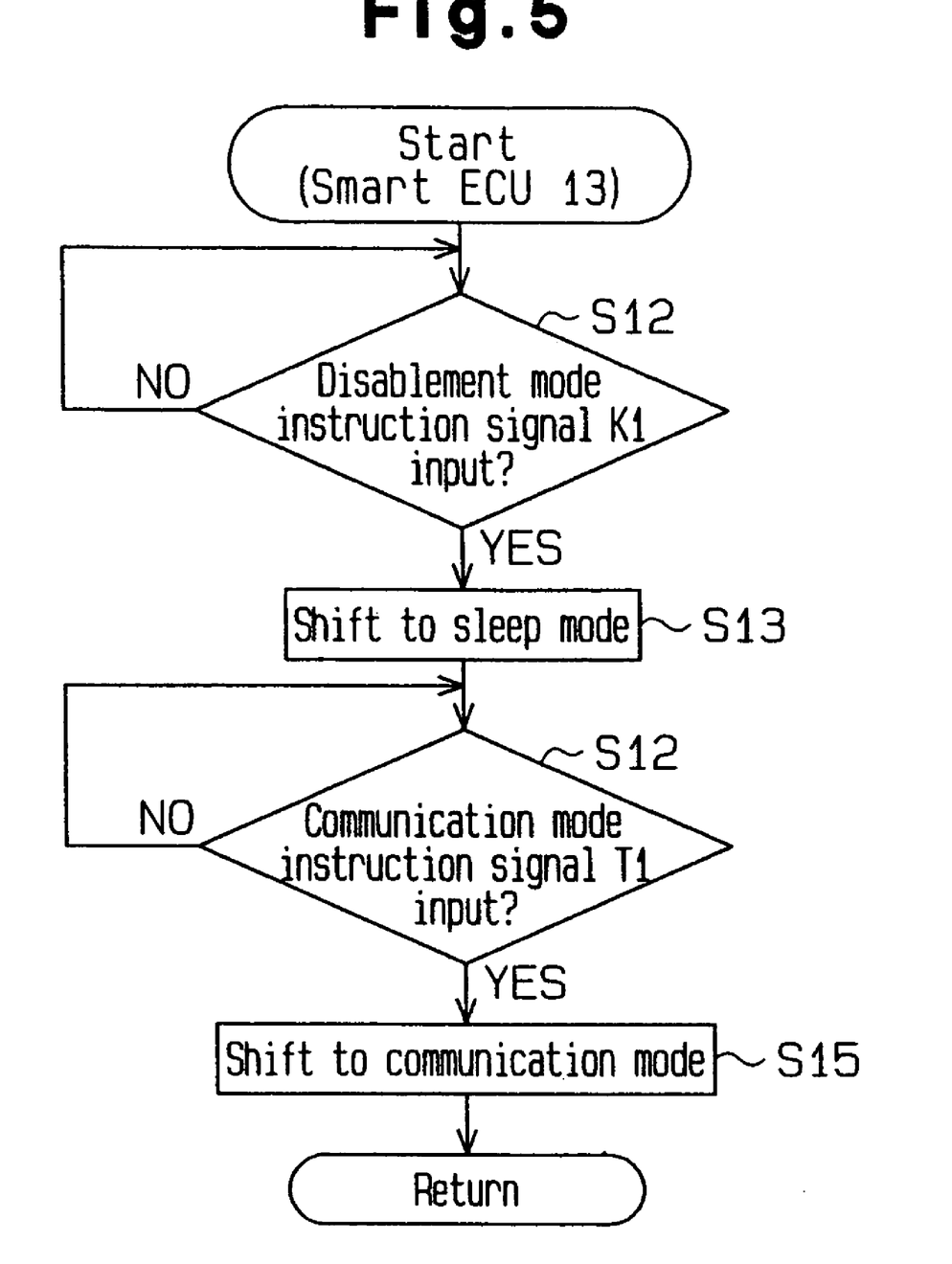
FIG. 5 is a flowchart showing a communication control program executed by a communication controller in the communication system of FIG. 1.

Referring to FIG. 5, when the smart ECU 13 is waiting for the input of the disablement mode instruction signal K1 and receives the disablement mode instruction signal K1 from the portable device 2 via the antenna 7 (YES in step S12), the smart ECU 13 shifts from the communication mode to the sleep mode (step S13). In the sleep mode, the smart ECU 13 disables automatic communication (signal transmitting) of the communication controller 4 relative to the portable device 2. That is, the smart ECU 13 causes the transmitting circuit 14 to enter a state in which signal transmitting is disabled and stops the output of the request signal from the communication controller 4.

When the microcomputer C1 is waiting for disablement mode exiting information (step S6), if the selection switch 201 is continuously activated twice, the selection device 20 generates disablement mode exiting information. The disablement mode exiting information is provided to the microcomputer C1 (YES in step S6). In accordance with the disablement mode exiting information, the microcomputer C1 outputs communication mode instruction signal T1, which is recognition information, via the antenna 12 (step S7). Then, the microcomputer C1 shifts from the disablement mode to the communication mode (step S8).

Referring to step S13 in FIG. 5, the smart ECU 13, which has entered the sleep mode, waits for the input of the communication mode instruction signal T1 (step S14). The smart ECU 13 receives the communication mode instruction signal T1 from the portable device 2 via the antenna 7 (YES in step S14). In response to the communication mode instruction signal T1, the smart ECU 13 shifts from the sleep mode to the communication mode (step S15).

After the microcomputer C1 shifts from the disablement mode to the communication mode (step S8), the microcomputer C1 waits to receive the request signal (step S9). When the portable deice 2 is in one of the ranges E1, the microcomputer C1 receives the request signal via the receiving circuit 9. When the request signal is received within a predetermined period (YES in step S9), the microcomputer C1 instructs the notification device 22 to light the lamp B1 (step S10). In response to the instruction, the notification device 22 lights the lamp B1. The microcomputer C1 remains in the communication mode (step S11).

When the portable device 2 is outside the ranges E1, the microcomputer C1 cannot receive the request signal. If the microcomputer C1 does not receive the request signal within the predetermined time (NO in step S9), the microcomputer C1 transmits the disablement mode instruction signal K1 via the transmitting circuit 10 (step S3), and generates an instruction for flashing the lamp R1 a predetermined number of times (step S4). The microcomputer C1 shifts from the communication mode to the disablement mode (step S5).

The smart ECU 13 functions as a determination unit for recognizing whether the portable device 2 is in the disablement mode or the communication mode through the communication controller 4 and, in accordance with the recognition, determines whether to continue or stop automatic communication (signal transmission) with respect to the portable device 2. The microcomputer C1 is a recognition information providing device for having the smart ECU 13 recognize the mode of the portable device 2.

The communication system 1 of the first embodiment has the advantages described below.

(1) If the selection switch 201 is activated to provide the microcomputer C1 with communication mode information when the portable device 2 is in one of the ranges E1, the microcomputer C1 transmits the communication mode instruction signal T1 to the communication controller 4 of the vehicle. The smart ECU 13 of the communication controller 4 receives the communication mode instruction signal T1 and recognizes whether the portable device 2 is in the communication mode.

If the selection switch 201 is activated to provide the microcomputer C1 with disablement mode information when the portable device 2 is in one of the ranges E1, the microcomputer C1 transmits the disablement mode instruction signal K1 to the communication controller 4. The smart ECU 13 receives the disablement mode instruction signal K1 and recognizes that the portable device 2 is in the disablement mode. In this state, the smart ECU 13 shifts to the sleep mode. This not only reduces power consumption of the portable device 2, which is in the disablement mode, but also reduces the power consumption of the communication controller 4.

(2) When the portable device 2 shifts to the disablement mode (steps S3 to S5), the lamp R1 flashes. Thus, the person holding the portable device 2 easily becomes aware that the portable device has entered the disablement mode. The lamp B1 is lit when the portable device 2 shifts to the communication mode (steps S7 to S11). Accordingly, the person holding the portable device 2 easily becomes aware that the portable device has shifted to the communication mode.

Figure 6:
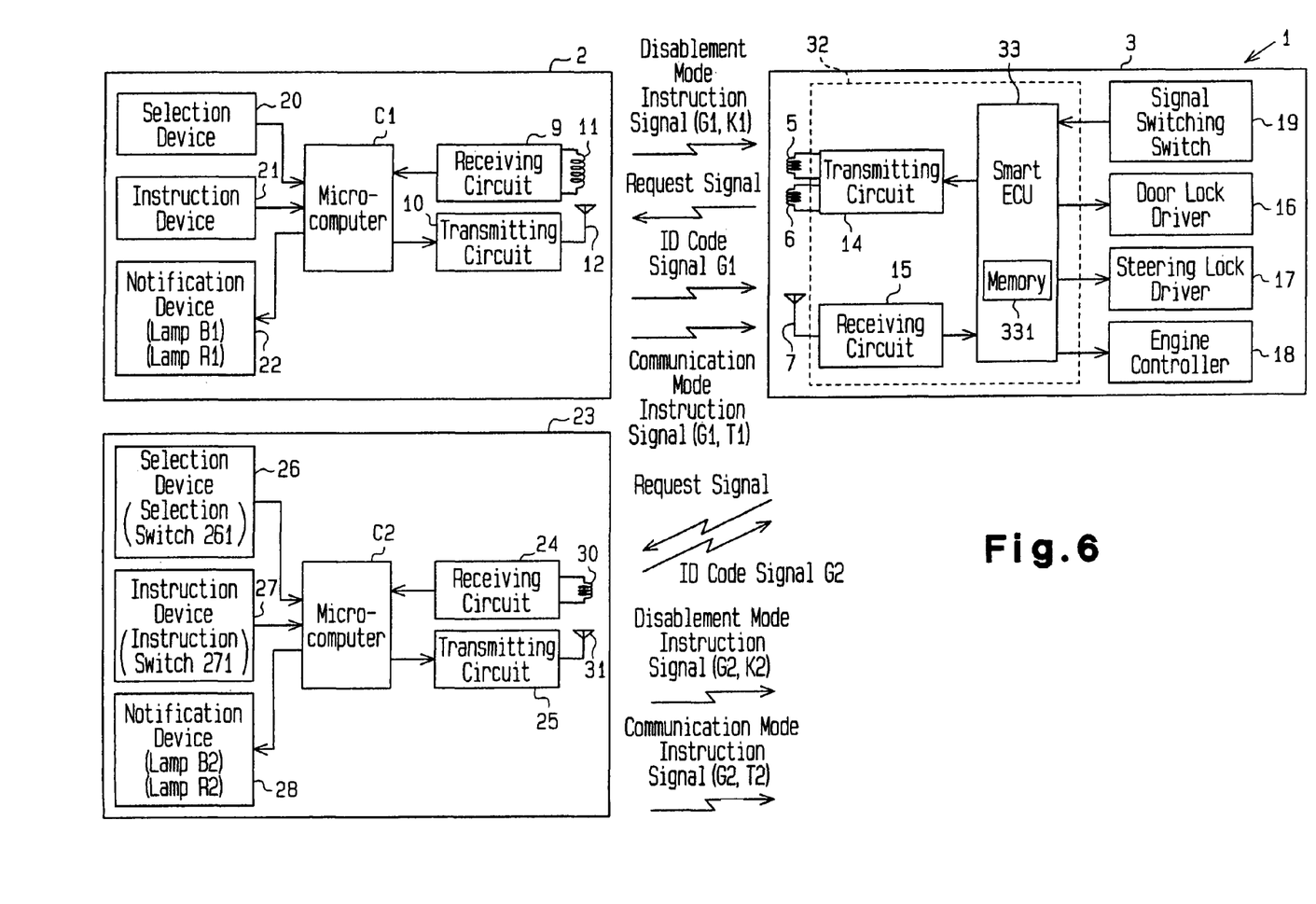
FIG. 6 is a schematic diagram of a communication system according to a second embodiment of the present invention.

FIG. 6 is a schematic diagram of a communication system 1A according to a second embodiment of the present invention. The communication system 1A of the second embodiment includes a further portable device 23.

The portable device 23 includes a microcomputer C2, a receiving circuit 24, a transmitting circuit 25, a selection device 26 including a selection switch 261, an instruction device 27 including an instruction switch 271, and a notification device 28. The microcomputer C2, the receiving circuit 24, the transmitting circuit 25, the selection device 26, and the instruction device 27 respectively have the same functions as the microcomputer C1, the receiving circuit 9, the transmitting circuit 10, the selection device 20, and the instruction device 21 of the portable device 2.

The receiving circuit 24 includes an antenna 30, and the transmitting circuit 25 includes an antenna 31. The notification device 28 includes lamps B2 and R2 arranged on a surface of the portable device 23. The lamp B2 is a blue LED, and the lamp R2 is a red LED.

The smart ECU 33 of the communication controller 32 controls the door lock driver 16, the steering lock driver 17, and the engine controller 18 in the same manner as the smart ECU 13 (determination unit) of the first embodiment. The smart ECU 33 recognizes which one of the disablement mode and the communication mode the portable devices 2 and 23 are in and, in accordance with the recognition, continues or stops automatic communication (signal transmission) with respect to the portable devices 2 and 23. The microcomputer C2 functions as a recognition information providing device for having the smart ECU 33 recognize whether the portable device 23 is in the disablement mode or the communication mode.

Figure 7:
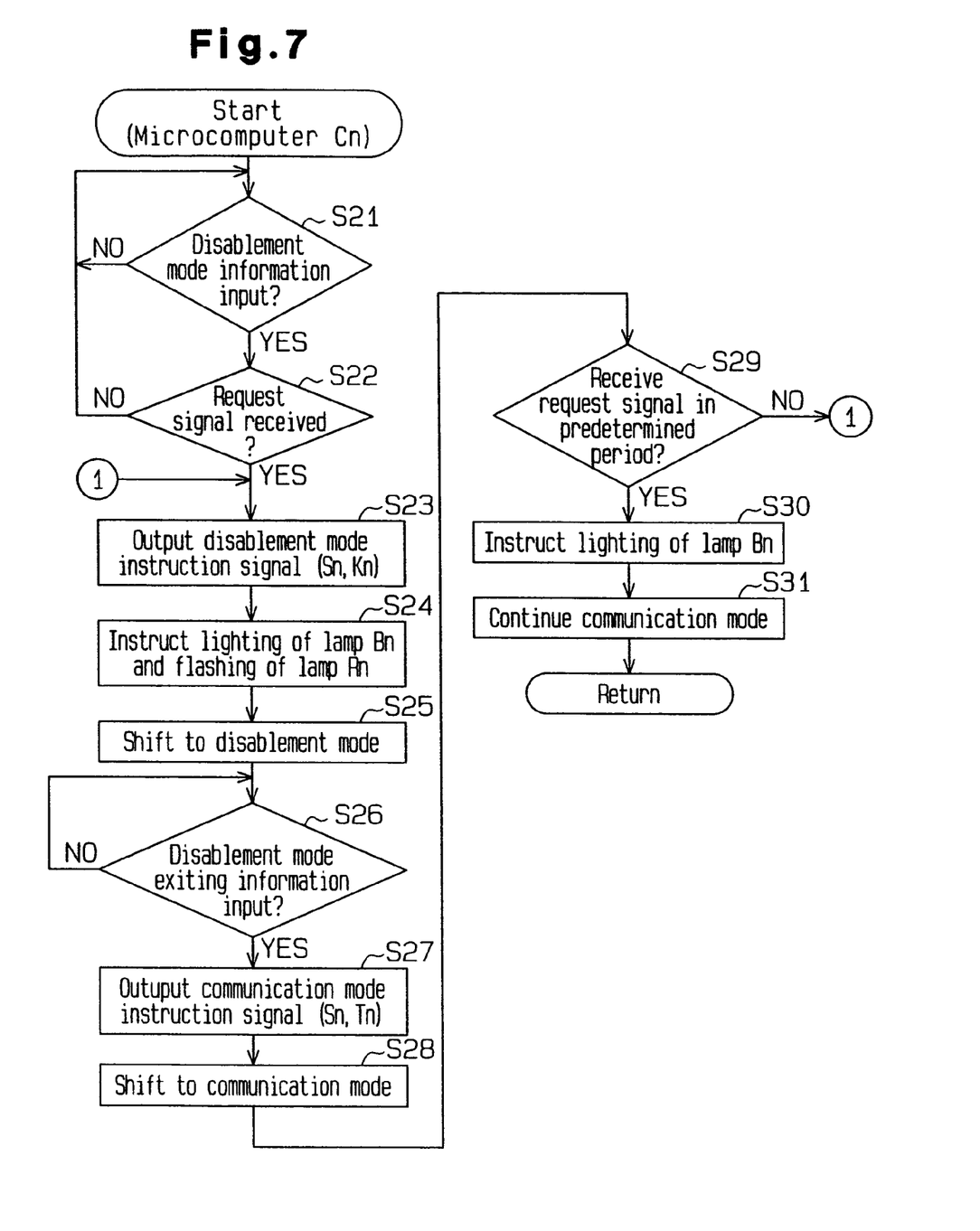
FIG. 7 is a flowchart showing a communication control program executed by a portable device in the communication system of FIG. 6.
Figure 8:
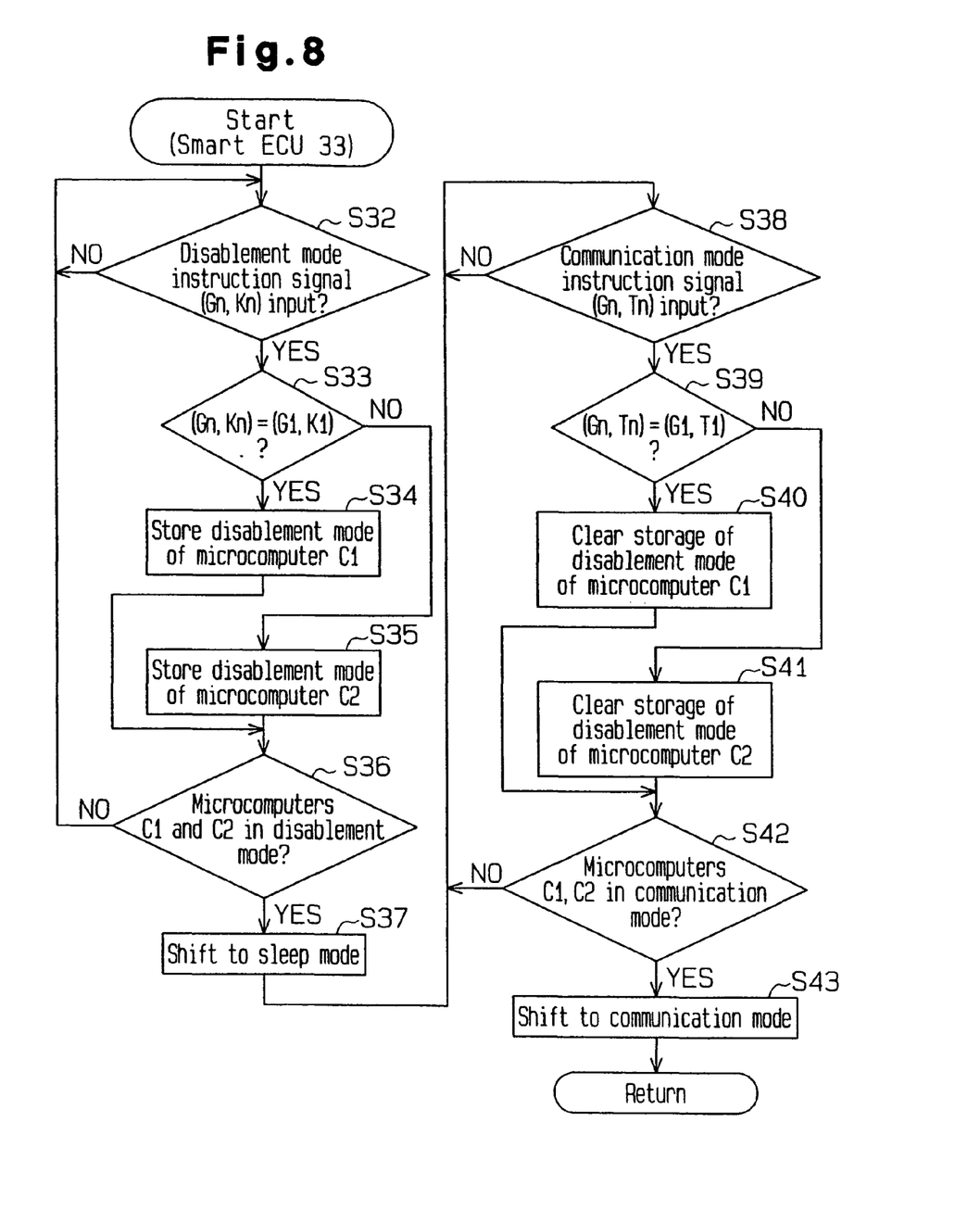
FIG. 8 is a flowchart showing a communication control program executed by a communication controller in the communication system of FIG. 6.

The communication control performed when the modes of the microcomputers C1 and C2 are switched between the communication mode and the disablement mode will now be discussed with reference to the flowcharts shown in FIGS. 7 and 8. In FIGS. 7 and 8, the letter n represents numerals 1 or 2. For example, Cn represents C1 or C2. A communication mode instruction signal (Gn, Tn) is a combination of the ID code signal Gn and an information signal Tn, which represents the communication mode. A disablement mode instruction signal (Gn, Kn) is a combination of the ID code signal Gn and the information signal Tn, which represents the disablement mode.

Figure 4:
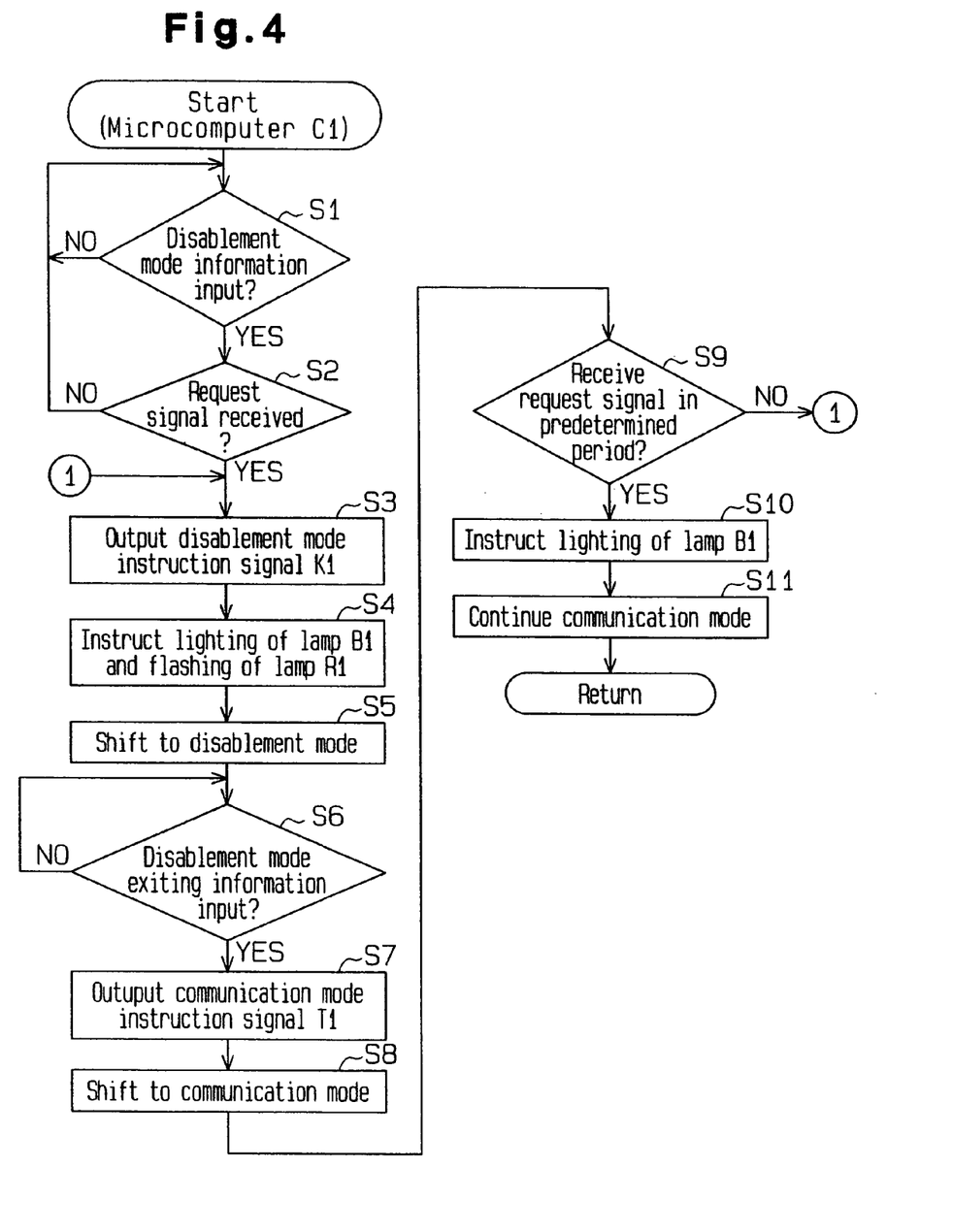
FIG. 4 is a flowchart showing a communication control program executed by the portable device in the communication system of FIG. 1.

The microcomputer C1 of the portable device 2 performs steps S23 and 27 as shown in FIG. 7 in lieu of steps S3 and S7 of FIG. 4 to output a disablement mode instruction signal (G1, K1) and a communication mode instruction signal (G1, T1), which serve as recognition information, as shown in FIG. 7. In the same manner, the microcomputer C2 of the portable device 23 outputs a disablement mode instruction signal (G2, K2) and a communication mode instruction signal (G2, T2). Except for step S23 and S27 in FIG. 7, the microcomputers C1 and C2 perform the same steps as those in the flowchart of FIG. 4. Thus, the communication control of FIG. 7 performed by the microcomputers C1 and C2 will not be described in detail below.

When the microcomputers C1 and C2 and the smart ECU 33 are in the communication mode, the lamps B1 and B2 of the portable devices 2 and 23 are lit. The microcomputers C1 and C2 enable automatic communication (signal receiving) of the portable devices 2 and 23 relative to the communication controller 32. In other words, the receiving circuits 9 and 24 are in a state in which the receiving of signals is enabled. The microcomputers C1 and C2 wait for the input of disablement mode information from the selection devices 20 and 26 (step S21). The smart ECU 33 waits for the input of the disablement mode instruction signal (Gn, Kn) (FIG. 7, step S32).

The smart ECU 33 receives the disablement mode instruction signal (Gn, Kn) via the antenna 7 (YES in step S32). When the received disablement mode instruction signal (Gn, Kn) is (G1, K1) (YES in step S33), the smart ECU 33 stores the disablement mode information of the microcomputer C1 in a memory 331 (step S34). When the disablement mode instruction signal (Gn, Kn) is (G2, K2) (NO in step S33), the smart ECU 33 stores the disablement mode information of the microcomputer C2 (step S35). When the smart ECU 33 stores the disablement mode information of only one of the microcomputers C1 and C2 (i.e., when only one of the microcomputers C1 and C2 is in the disablement mode, and step S36 is NO), the smart ECU 33 returns to step S32.

When the smart ECU 33 stores the disablement mode information of the microcomputers C1 and C2 (i.e., when only one of the microcomputers C1 and C2 is in the disablement mode, and step S36 is YES), the smart ECU 33 shifts from the communication mode to the sleep mode (step S37). In the sleep mode, the smart ECU 33 disables automatic communication (signal transmission) of the communication controller 32 with respect to the portable devices 2 and 23. In other words, the smart ECU 33 disables the transmission of signals in the transmitting circuit 14 and stops outputting the request signal from the communication controller 32. In the sleep mode, the smart ECU 33 waits for the input of the communication mode instruction signal (Gn, Tn) (step S38).

If the instruction switches 211 and 271 are activated when the microcomputers C1 and C2 are in the disablement mode, the microcomputers C1 and C2 transmit the ID code signals G1 and G2 via the transmitting circuits 10 and 25, respectively. When the portable devices 2 and 23 are in one of the ranges E1, the smart ECU 33 receives the ID code signals G1 and G2 and performs code verification. When the codes are verified, the smart ECU 33 activates the door lock driver 16 to unlock the doors 8.

The smart ECU 33 receives the communication mode instruction signal (Gn, Tn) via the antenna 7 (YES in step S38). When the communication mode instruction signal (Gn, Tn) is (G1, T1) (YES in step S39), the smart ECU 33 clears the stored disablement mode information of the microcomputer C1 (step S40). When the communication mode instruction signal (Gn, Tn) is (G2, T2) (NO in step S39), the smart ECU 33 clears the stored disablement mode information of the microcomputer C2 (step S41). When the smart ECU 33 stores the disablement mode information of either one of the microcomputers C1 and C2 (i.e., when one of the microcomputers C1 and C2 is in the communication mode, and step S42 is NO), the smart ECU 33 returns to step S38.

When the smart ECU 33 clears the stored disablement mode information of both microcomputers C1 and C2 (i.e., when the microcomputers C1 and C2 are both in the communication mode, and step S42 is YES), the smart ECU 33 shifts to the communication mode from the sleep mode.

The communication system 1A of the second embodiment has the advantages described below.

(1) If the selection switches 201 and 261 are activated to provide the microcomputers C1 and C2 with communication mode information when the portable devices 2 and 23 are in one of the ranges E1, the microcomputers C1 and C2 respectively output the communication mode instruction signal (Gn, Tn) via the transmitting circuits 10 and 25. The smart ECU 33 receives the communication mode instruction signal (Gn, Tn) and recognizes that the portable devices 2 and 23 are in the communication mode.

If the selection switches 201 and 261 are activated to provide the microcomputers C1 and C2 with communication mode information when the portable devices 2 and 23 are in one of the ranges E1, the microcomputers C1 and C2 respectively output the disablement mode instruction signal (Gn, Kn) via the transmitting circuits 10 and 25. The smart ECU 33 receives the disabling mode instruction signal (Gn, Kn) and recognizes that the portable devices 2 and 23 are in the disablement mode. The smart ECU 33 stops automatic communication (signal transmission) relative to the portable devices 2 and 23 only when one of the portable devices 2 and 23 is in the disablement mode. This reduces the power consumption of the communication controller 32. In other words, when each one of the portable devices 2 and 23 is in the disablement mode, in addition to the power consumption of the portable devices 2 and 23 that are in the disablement mode being reduced, the power consumption of the communication controller 32 is reduced.

(2) When one of the portable devices 2 and 23 is in the communication mode, the smart ECU 33 does not shift to the sleep mode. Accordingly, when one of the portable devices that is in the communication mode enters the ranges E1, the doors 8 are automatically unlocked, and the usage of the portable device in the communication mode is ensured.

It should be apparent to those skilled in the art that the present invention may be embodied in many other specific forms without departing from the spirit or scope of the invention. Particularly, it should be understood that the present invention may be embodied in the following forms.

In the second embodiment, the communication controller may issue a request signal received only by the portable device 2 and a request signal received only by the portable device 23. In this case, it is preferable that the communication controller stops transmitting the request signal for the portable device 2 when the portable device 2 is in the disablement mode and that the communication controller stops transmitting the request signal for the portable device 23 when the portable device 23 is in the disablement mode. This reduces the power consumption of the communication controller.

In the second embodiment, three or more portable devices may be used for the communication controller.

In each of the above embodiments, the lamps R1 and R2 may be lit when the portable devices 2 and 23 are in the disablement mode.

In each of the above embodiments, the notification device may be eliminated.

In each of the above embodiments, the transmitting circuit may be in a state in which the transmission of signals is disabled when the portable device is in the disablement mode. In this case, the power required for transmitting the ID code from the transmitting circuit in response to the request signal is not consumed. This also reduces power consumption of the portable device. If the instruction switches 211 and 271 of the instruction devices 21 and 27 are activated when the portable device is in the disablement mode, the transmitting circuit may be returned to a state in which the transmission of signals is enabled.

In each of the above embodiments, if the portable device is in the disablement mode, the receiving circuit of the portable device may enter a state in which the receiving of signals is disabled while the transmitting circuit is in a state in which the transmitting of signals is disabled.

In each of the above embodiments, a selection device for selecting one of the disablement mode and the communication mode for the portable device may be installed in the vehicle 3. In this case, the smart ECU may be provided with the functions of a recognition information providing device. Further, the smart ECU may transmit selection information selected by the selection device (selection information of the disablement mode or communication mode) to the portable device.

The present invention may be applied to a communication system including a communication controller that enables automatic communication with the portable device and controls a door lock driver that locks and unlocks a door of a house.

The portable device does not have to be a card type device and may be configured in a key plate.

The present examples and embodiments are to be considered as illustrative and not restrictive, and the invention is not to be limited to the details given herein, but may be modified within the scope and equivalence of the appended claims.

What is claimed is:

1. A communication system comprising:
   a portable device provided with a communication function;
   a communication controller which automatically performs wireless communication with the portable device and controls a predetermined driver in accordance with whether wireless communication with the portable device is established;
   a selection device which selects one of a disablement mode, which disables automatic communication of the portable device with respect to the communication controller, and a communication mode, which enables automatic communication of the portable device;
   a determination unit which recognizes which one of the disablement mode and the communication mode the portable device is in to determine whether to enable or disable automatic communication with respect to the portable device in accordance with the recognition; and
   a recognition information providing device which provides the determination unit with recognition information used to recognize which one of the disablement mode and the communication mode the portable device is in, in accordance with the selection by the selection device; and
   an instruction device issues an instruction which instructs the portable device to issue a signal causing the communication controller to operate the predetermined driver when the portable device is in the disablement mode, wherein the communication controller includes the determination unit and stops outputting a signal when the determination unit determines that the portable device is in the disablement mode based on the recognition information provided from the recognition information providing device, wherein the portable device includes the selection device and the recognition information providing device, wherein the portable device includes a receiving circuit which receives a signal from the communication controller, the portable device inactivating the receiving circuit when the portable device is in the disablement mode, wherein the recognition information includes one of a communication mode signal, which indicates the communication mode, and a disablement mode signal, which indicates the disablement mode, and wherein the portable device transmits the signal to the communication controller by wireless communication based on the instruction from the instruction device without shifting from the disablement mode to the communication mode, and wherein the portable device includes a transmitting circuit which transmits a signal to the communication controller, the portable device inactivating the transmitting circuit when the portable device is in the disablement mode and activating the transmitting circuit in response to the instruction from the instruction device in the disablement mode, wherein the communication controller intermittently transmits a request signal, and the recognition information providing device of the portable device provides the determination unit with the disablement mode signal when the recognition information providing device receives disablement mode information generated by the selection device of the portable device and the receiving circuit receives the request signal from the communication controller in a predetermined range that is capable of wireless communication.

2. The communication system according to claim 1, further comprising at least one other portable device, and the determination unit disabling automatic communication with respect to each portable device when all of the portable devices are in the disablement mode.

3. The communication system according to claim 1, wherein the portable device includes a notification device which generates a notice that the portable device is in the disablement mode and which generates a notice that the portable device has shifted from the disablement mode to the communication mode.

4. The communication system according to claim 1, wherein the predetermined driver is a door lock driver which locks and unlocks a door.

5. The communication system according to claim 4, wherein the door lock driver locks and unlocks the door of a vehicle.

6. The communication system according to claim 4, wherein the door lock driver locks and unlocks the door of a house.

7. A method for reducing power consumption in a communication system, the communication system including a portable device and a communication controller that performs automatic communication with the portable device and controls a predetermined driver in accordance with whether wireless communication with the portable device is established, wherein the communication controller intermittently transmits a request signal, and wherein the portable device includes a receiving circuit which receives a signal from the communication controller and a transmitting circuit which transmits a signal to the communication controller, the method comprising:

selecting with the portable device one of a disablement mode which disables automatic communication of the portable device relative to the communication controller and a communication mode which enables automatic communication of the portable device;

transmitting recognition information from the portable device to the communication controller in accordance with the selection by the portable device, wherein the recognition information is used to recognize which one of the disablement mode and the communication mode the portable device is in, and wherein the recognition information includes one of a communication mode signal, which indicates the communication mode, and a disablement mode signal, which indicates the disablement mode;

determining with the communication controller which one of the disablement mode and the communication mode the portable device is in from the recognition information;

the communication controller disabling automatic communication of the communication controller relative to the portable device and stopping outputting a signal from the communication controller when the communication controller determines that the portable device is in the disablement mode based on the recognition information transmitted from the portable device; and inactivating the receiving circuit when the portable device is in the disablement mode;

issuing an instruction instructing the portable device to issue a signal causing the communication controller to operate the predetermined driver when the portable device is in the disablement mode, wherein the portable device transmits the signal to the communication controller by wireless communication based on the instruction without shifting from the disablement mode to the communication mode;

inactivating the transmitting circuit when the portable device is in the disablement mode; and activating the transmitting circuit in response to the instruction from the instruction device in the disablement mode, wherein said transmitting recognition information includes transmitting the disablement mode signal from the portable device to the communication controller when the portable device internally receives disablement mode information and the receiving circuit receives the request signal from the communication controller in a predetermined range that is capable of wireless communication.

8. The method according to claim 7, further comprising:
generating a notice that the portable device is in the disablement mode; and
generating a notice that the portable device has shifted from the disablement mode to the communication mode.

9. The communication system according to claim 1, wherein the portable device waits in a standby mode and automatically returns an ID code signal used for code verification by the communication controller only when receiving the request signal.

10. The communication system according to claim 1, wherein the communication controller shifts from the communication mode to a sleep mode when the communication controller receives the disablement mode signal and recognizes that the portable device is in the disablement mode.

11. The method according to claim 7, further comprising the portable device waiting in a standby mode and automatically returning an ID code signal used for code verification by the communication controller only when receiving the request signal.

12. The method according to claim 7, further comprising the communication controller shifting from the communication mode to a sleep mode when the communication controller receives the disablement mode signal and recognizes that the portable device is in the disablement mode.

* * * * *